Aug. 26, 1930.  W. J. STEINBREDER  1,773,760
TENT STAKE
Filed Feb. 9, 1927
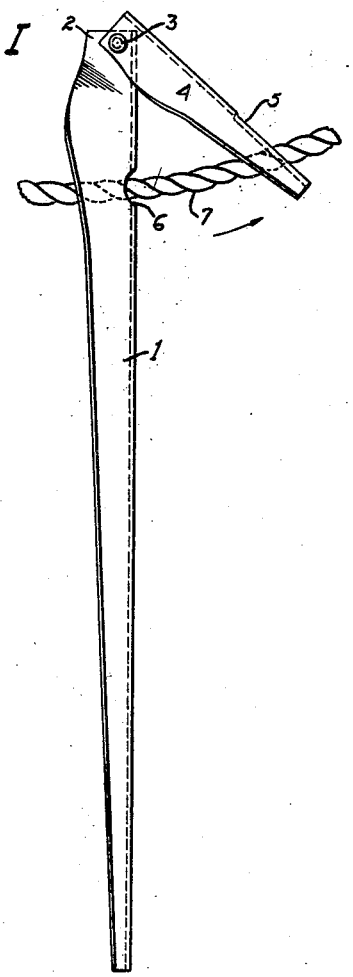
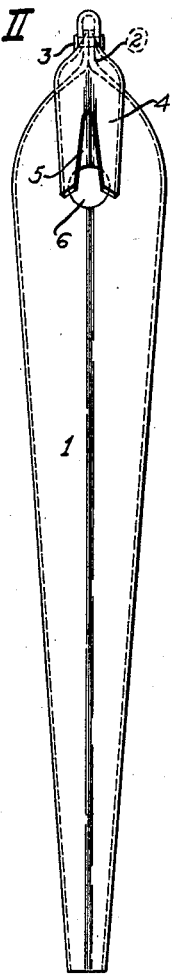
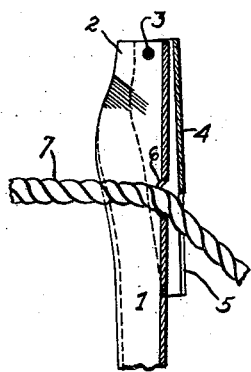
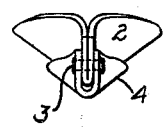
INVENTOR
W. J. STEINBREDER
BY J. H. Cook
ATTORNEY Patented Aug. 26, 1930

1,773,760

UNITED STATES PATENT OFFICE

WILLIAM J. STEINBREDER, OF ST. LOUIS, MISSOURI

TENT STAKE

Application filed February 9, 1927. Serial No. 166,940.

My invention relates to a new and useful improvement in tent stakes, and has for its object to provide a rope-holding device cooperable with and secured to said tent stake, whereby said rope may be pulled in one direction but not permitted to move in the opposite direction without being manually released from the holding device.

With the foregoing and other objects in view, the invention comprises the novel construction, combination and arrangement of parts hereinafter more specifically described and illustrated in the accompanying drawings, wherein is shown the preferred embodiment of the invention. However, it is to be understood that the invention comprehends changes, variations and modifications which come within the scope of the claims hereunto appended.

Fig. I is a side elevation of my improved device with the rope holder in extended position.

Fig. II is a front elevation of my improved device.

Fig. III is a side view of the upper portion of my device with the parts in the rope-locking position.

Fig. IV is an enlarged detail view showing the pivotal connection between the rope holder and the stake.

In the drawing, 1 designates a stake preferably stamped of sheet metal and of angular form, tapered as shown in Fig. II so that the widest part is near the top and the narrowest part at the bottom, so that said stake may be conveniently driven into the ground. The upper portion 2 of said stake is pressed together and provided with an aperture through which a pivot pin 3 is inserted. 4 designates a rope-holding device, also, preferably, of angular form and provided with a tapered slot 5 at its free end. 6 is a hole provided in the upper portion of the stake 1 and through which a rope 7 is adapted to pass. It will be noted that the inner end of the rope-holding device 4 is pressed together and apertured to receive the pivot pin 3, so that when said pivot pin 3 is passed through the openings in the rope-holding device 4 and the hole in the upper end 2 of the stake 1, the rope-holding device 4 is pivotally engaged with the upper end 2 of the stake 1.

The rope 7, which is secured to a tent (not shown) may be freely moved in the direction indicated by the arrow in Fig. I, which lifts the rope-holding device 4, but when the rope is released the rope-holding device which engages the rope 7 moves with the rope and locks the rope securely against movement, particularly as shown in the view in Fig. III; that is, the opening 5 is smaller at its upper portion than the diameter of the rope 7, which securely binds said rope and prevents it from movement in a direction opposite to that in which it is shown to be freely movable in Fig. I. It will be noted by reference to Fig. III that the opening 6 in the stake 1 and the portion of the opening 5 of sufficient diameter to permit the rope to freely pass through are not in registration with each other; that is to say, when the parts are in the position shown in Fig. III the rope is tightly secured against movement by virtue of the rope being caught in the smaller part of the opening 5.

By my device I eliminate a considerable amount of rope that is now employed in tents by virtue of the present arrangement for securing said ropes against movement when fastened to the tent stakes. By my device a minimum amount of rope is used and an extremely efficient and simple holding device is employed.

As will be noted in Fig. III, with the rope-holding device 4 in the position there indicated the rope 7 is caused to assume an abrupt bend which securely locks it against movement tending to loosen said rope. It may be noted that the tent stakes 1 are driven at an angle into the ground, so that the rope 7 from the tent enters said stake at approximately a right angle to the body of said stake.

The tent slides which my device displaces are adapted to take up the slack in the rope and require sufficient rope to permit said tent slides to operate effectively. By my simple arrangement the tent slides are eliminated and no superfluous rope is needed in order to securely hold said rope in tightened condition when attached to my improved stake.

I claim:

1. A tent stake provided with a rope opening, and a member pivoted to said tent stake externally thereof, said member being also provided with a rope opening, the rope opening in said pivoted member being tapered longitudinally whereby a rope passing through said openings in said stake and said pivoted member may move substantially unobstructed in one direction through the first named rope opening and be prevented from sliding in the opposite direction.

2. A tent stake provided with a rope opening near the top of said stake, and a member pivoted to said stake at the top and externally thereof, said member being also provided with a rope opening, the rope opening in said pivoted member being tapered longitudinally whereby a rope passing through said openings in said stake and said pivoted member may move substantially unobstructed in one direction through the first named rope opening and be prevented from sliding in the opposite direction.

3. A tent stake provided with a rope opening near the top of said stake, and a member pivoted at one end to said stake at the top and externally thereof, said member being provided with a tapered longitudinally extending opening the smallest portion of which is nearer the pivot, whereby a rope passing through said openings in said stake and said pivoted member may freely slide in one direction and be adapted to be caught in the smaller portion of said opening in said pivoted member to restrain it from sliding in the opposite direction.

In testimony that I claim the foregoing I hereunto affix my signature.

WILLIAM J. STEINBREDER.